United States Patent [19]
Savich

[11] Patent Number: 5,192,554
[45] Date of Patent: Mar. 9, 1993

[54] LABEL DISPENSER FOR BLOW MOLDING MACHINES

[75] Inventor: Peter P. Savich, Longmeadow, Mass.

[73] Assignee: First Brands Corporation, Danbury, Conn.

[21] Appl. No.: 641,219

[22] Filed: Jan. 15, 1991

[51] Int. Cl.$^5$ .............................................. B29C 49/24
[52] U.S. Cl. ............................ 425/504; 156/DIG. 18; 156/DIG. 31; 264/509; 425/522
[58] Field of Search ............... 425/503, 504, 522, 537, 425/437, 444; 264/509; 156/DIG. 18, DIG. 31; 271/11, 90

[56] References Cited

U.S. PATENT DOCUMENTS

| | | | |
|---|---|---|---|
| 4,359,314 | 11/1982 | Hellmer | 425/504 X |
| 4,549,863 | 10/1985 | Bourgeois | 425/522 X |
| 4,639,207 | 1/1987 | Slat et al. | 425/503 |
| 4,983,348 | 1/1991 | Barresi et al. | 425/503 X |

Primary Examiner—Richard L. Chiesa
Attorney, Agent, or Firm—Gary L. Wamer

[57] ABSTRACT

An in-mold label dispenser for a blow molding machine having a dispensing head mounted on a base for movement along a first path from adjacent a label magazine to between the open sections of a mold. The label carrier is mounted on the dispensing head for movement along a second path substantially transverse to the first path from a retracted to an extended position. A drive mechanism is mounted in the base for moving the dispensing head along the first path and the label carrier along the second path in co-ordination with the opening of the mold. An adjustable stop assembly is provided on the label carrier for stopping movement of the label carrier along the second path after the label carrier has moved a sufficient distance into the mold section to establish a gap of predetermined width between the label and the wall of the mold cavity.

27 Claims, 10 Drawing Sheets

LABEL DISPENSER FOR BLOW MOLDING MACHINES

BACKGROUND OF THE INVENTION

This invention relates to blow molding machines and, more particularly, to an improved in-mold label dispenser for use with such machines.

Conventional blow molding machines include an extruder for extruding a parison of hot plastic between open sections of a mold. The extruded parison is clamped between the mold sections when the mold is closed and is then inflated by blowing air into the parison so that the parison assumes the shape of the mold. After cooling, the mold sections are opened and the molded part is then ejected from the mold.

Containers for various products are conventionally made by using blow molding machines. The containers are provided with labels, such as paper or paper/thermoplastic composite labels, in order to identify the products. The labels may be applied by gluing them to the containers after they have been ejected from the mold. The problem with these labels is that they often wrinkle or are improperly aligned on the containers. Moreover, they require a separate labeling step after molding which increases the cost of manufacturing the containers.

In more recent years, label dispensers have been developed which insert the labels within the mold prior to extrusion of the hot plastic parison and before closing the mold. Once the mold is closed with the label in place, the blowing operation that follows forms the hot plastic parison around the label to the shape of the mold and activates a heat sensitive adhesive which provides a permanent bond between the label and the container. These in-mold label dispensers thus effectively eliminate the need for a separate labeling step after the molded containers have been ejected from the mold. Moreover, labels applied by in-mold labeling add strength to the walls of the containers and thus allow the containers to be made with less plastic during the blow molding operation.

An in-mold labeling dispenser for a blow molding machine which has enjoyed considerable success in recent years is disclosed in U.S. Pat. No. 4,639,207 issued to W. A. Slat et al. on Jan. 27, 1987. This in-mold label dispenser is designed for use with a blow molding machine including a plurality of molds preferably arranged on a rotating wheel, each of the molds including mold sections that are movable between open and closed positions and which cooperatively define a mold cavity when the mold sections are brought to the closed position.

The label dispenser includes a label magazine for storing a plurality of labels to be dispensed into the mold and a dispensing head which is mounted for rectilinear movement along a first axis from adjacent the label magazine to between the mold sections in the open position of the mold. A label carrier is mounted on the dispensing head for rectilinear movement between retracted and extended positions along a second axis that is traverse to the first axis preferably in a perpendicular relationship. A drive mechanism moves the dispensing head and the label carrier in a coordinated fashion to transfer labels from the magazine to the mold for in-mold labeling prior to the blow molding operation. The label carrier includes vacuum cups for selectively removing one label at a time from the magazine and for holding the label in place as it is being carried to the mold.

During operation of the label dispenser, the label carrier is moved by the drive mechanism from the retracted position to the extended position with the dispensing head adjacent the label magazine whereupon the label carrier withdraws one label from the magazine. The label carrier is then moved together with the label to the retracted position while the dispensing head is moved to a position between the mold sections in the open position. The drive mechanism then moves the label carrier to the extended position where the label is deposited onto one of the mold sections within its mold cavity. The label carrier is moved back to the retracted position and the dispensing head is moved by the drive mechanism from between the mold sections to adjacent to the label magazine where the cycle begins again to deposit another label in the next mold.

Although these prior art in-mold label dispensers are designed to accurately place a label within a mold section of each open mold during operation of the blow molding machine, the location of the molds may vary as they rotate around the wheel to a position adjacent to the labeling station. As a result, the labels may be seriously misaligned when applied to the molded containers.

It is therefore an important object of this invention to provide an improved in-mold label dispenser for a blow molding machine which avoids the problems and difficulties of the prior art.

Another more specific object of this invention is to provide such an improved in-mold label dispenser which can accurately position the label carrier within each mold cavity for transferring a label thereto despite any variance in the location of the mold during operation of the blow molding machine.

BRIEF DESCRIPTION OF THE INVENTION

The invention is directed to an improved in-mold label dispenser for a blow molding machine including at least one mold having mold sections which are moveable between open and closed positions. The mold sections include cavity sections which cooperatively define a cavity for performing the blow molding operation when in the closed position and which permit ejection of a molded part when in the open position.

The label dispenser comprises a label magazine for storing labels, a base and a dispensing head which is mounted on the base for movement along a first path from adjacent the label magazine to between the mold sections in the open position. A label carrier is mounted on the dispensing head for movement along a second path substantially transverse to the first path between retracted and extended positions. A drive mechanism is mounted in the base for moving the dispensing head along the first path and the label carrier along the second path in co-ordination with the movement of each mold. The drive mechanism includes an elongated support extending between the base and the mold sections for supporting the dispensing head as it moves along the first path and also includes means for oscillating the elongated support about an axis substantially transverse to the second path.

An oscillating lever assembly is connected between the elongated support and the label carrier to provide the extending and retracting movement of the label carrier upon rotation of the support member. The label carrier is moved along the second path by the lever assembly to its extended position adjacent the label magazine in order to receive a label and is then moved back again to the retracted position. The dispensing head is moved at the same time along the first path by the drive mechanism to between the open mold sections. The label carrier is then moved along the second path by the lever assembly toward its extended position in order to deposit the label onto the wall of the cavity section while the mold is still open.

An adjustable stop assembly is provided for stopping movement of the label carrier along the second path toward its extended position after the label carrier has moved a sufficient distance into the cavity section to establish a gap of a predetermined width between the label and the wall of the cavity section. The width of the gap should be such as to permit rapid transfer of the label from the label carrier to the cavity wall.

The oscillating lever assembly also includes bias means which is so constructed and arranged as to allow rotation of the support member to continue after the stop assembly has been engaged to stop movement of the label carrier, thereby avoiding any possible damage to the label carrier and its associated parts.

In its preferred construction, the adjustable stop assembly includes a pair of elongated arms which extend outwardly in a direction transverse to the movement of the label carrier. The elongated arms carry adjustable contact members at the outer ends which are adapted to make contact with a surface portion of the mold when the label carrier enters the cavity section to deposit a label. Adjusting means are provided to preset the contact members at varying positions relative to the elongated arms and thus accurately locate the label carrier inside the cavity section in order to establish the desired gap between the label and the cavity wall before transfer of the label.

Also in its preferred construction, the oscillating lever assembly comprises an annular mount which is secured to the elongated support for rotation about its axis and an elongated lever pivotally connected at one end to the annular mount. The elongated lever is connected at its other end to a cam follower. The cam follower is mounted within a track on a cam member which is connected in turn to the label carrier.

The label carrier is preferably mounted inside a slideway provided on the dispensing head for movement between its retracted and extended positions. The cam track extends across the label carrier transversely to the direction of label carrier movement and the cam follower is slidably mounted within the track.

When the annular mount is caused to rotate in one direction by the oscillating support, the elongated lever pivotally connected thereto forces the cam follower to slide inside the cam track. This in turn forces the label carrier to move along the slideway in a direction toward its retracted or extended position. The label carrier is forced to move in an opposite direction by the lever assembly when the oscillating support rotates in the reverse direction. Preferably, the elongated lever is adjustably connected to the sliding cam follower in order to control the degree of extending and retracted movement of the label carrier upon rotation of the support member.

According to the invention, the oscillating lever assembly further includes a biasing member, such as a coil spring, which is interposed between the rotating annular mount and the elongated lever. The biasing member is arranged such that when the annular mount is rotated in a direction that forces the label carrier to move into a cavity section in order to deposit a label, the biasing member will undergo compression and thereby permit the annular mount to continue to rotate under the impetus of the oscillating support even though the adjustable stopping assembly has engaged the mold surface to limit any further movement of the label carrier. Thus, in those cases where the location of the molds may vary as they arrive at the labeling station, both the stop and the lever assemblies combine to accurately deposit the labels on the walls of the cavity sections while at the same time protecting the label carrier from possible damage.

In a preferred embodiment of the invention, the label dispenser includes a pair of label magazines and a pair of label carriers that are utilized to deposit a pair of labels, one on each mold section of the mold. The arrangement of the label dispenser whereby the dispensing head and label carrier move rectilinearly along a first and second path, respectively, permits both labels to be simultaneously deposited on the mold sections despite the fact that only a limited space exists between the mold sections when in the open position.

The label dispenser in its preferred embodiment further includes a pair of elongated shafts for driving a pair of oscillating lever assemblies according to the invention which are connected to the pair of label carriers in the dispensing head. The elongated shafts are mounted for oscillation in the base and extend parallel to one another providing elongated supports for movably mounting the dispensing head. During operation of the dispenser, the dispensing head supported by the pair of elongated shafts moves rectilinearly along the first path from between the pair of label magazines to between the mold sections in the open position. The drive mechanism includes a first gear unit that drives the dispensing head in its movement along the first path via a suitable drive linkage. The drive mechanism further includes a second gear unit that oscillates the elongated shafts which, in turn, actuate the pair of lever assemblies for moving the label carriers between the retracted and extended positions. Both the first and second gear units operate in association with a main drive to which the drive mechanism is connected.

BRIEF DESCRIPTION OF THE DRAWING

The invention will now be described in greater detail with particular reference to the accompanying drawings which show a preferred embodiment of an improved in-mold label dispenser according to the invention used in conjunction with a typical blow molding machine and wherein.

DESCRIPTION OF THE PREFERRED EMBODIMENTS

Figure 1:
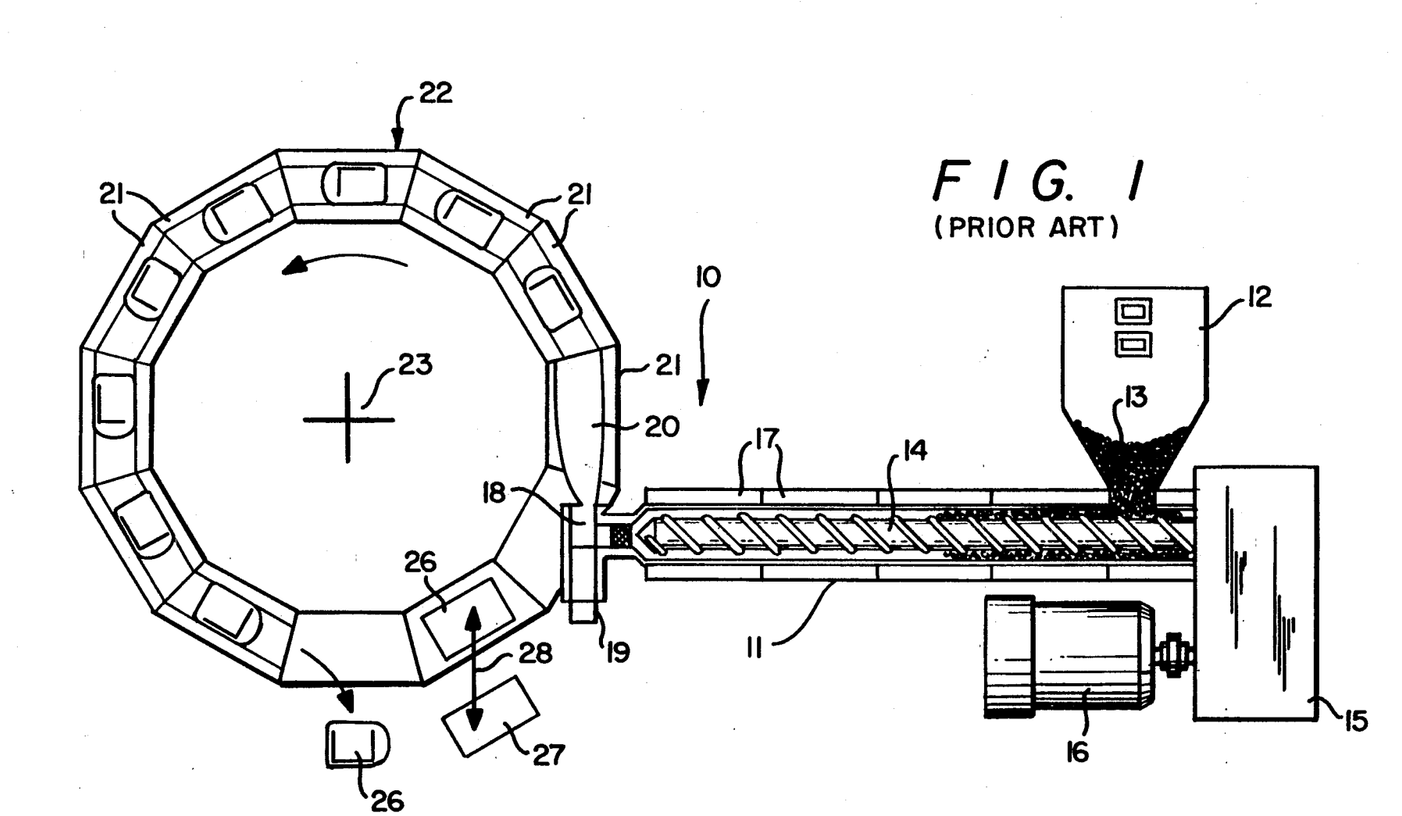
FIG. 1 is a schematic, elevational view of a blow molding machine including an extruder and a rotating wheel composed of individual molds for making blow molded parts and showing schematically the ejection, in-mold label dispensing and extrusion stations.

Referring now to the drawings and more particularly to FIG. 1, there is shown a conventional blow molding machine indicated generally at 10 including an extruder 11 having a hopper 12 for feeding a solid, particulate, resin composition 13 to one end of a rotating screw 14 driven by a gear box 15 and an electric motor 16. The particulate resin 13 is continuously fed along the length of the extruder 11 by the rotating screw 14 and is converted to a hot plastic by a series of heating zones 17 surrounding the extruder 11. At the opposite end of the extruder 11, the hot plastic resin is fed through a die 18, preferably equipped with a programming head 19, to form a vertically extruded parison 20. The programming head 19 provides for precise distribution of the hot plastic in variable quantities along the profile of the container or other product to be molded. The parison 20 is extruded within one of a plurality of molds 21 arranged in a continuously rotating wheel generally indicated at 22, there being twelve such molds shown in the blow molding machine illustrated. The wheel 22 is rotated in a counterclockwise direction as shown by the arrows in the drawing about an axis 23 at a relatively constant speed by a drive mechanism (not shown).

The molds 21 are composed of sections 24 (see FIGS. 2 and 3) which are opened and closed at precisely timed intervals by a cam mechanism (not shown) during each rotation of the wheel 22. The mold sections 24 include cavity sections 25 which face one another when the molds are open but which form a complete mold cavity when the mold sections are closed. The mold sections 24 are opened at the bottom of the wheel 22 to eject a molded container 26 and remain open until after the mold 21 has rotated past the extruder 11.

A label 27 is deposited inside one or both of the mold sections 24 prior to extrusion of the parison 20 as schematically represented by the arrows 28. The mold sections 24 are closed after the parison 20 has been extruded and air is then injected under pressure into the extruded parison 20. The air pressure forces the parison 20 against the wall of each cavity section 25 containing a deposited label 27 and reshapes it into the final configuration of the molded container 26. A heat sensitive adhesive may be applied to each label 27 which is activated upon contact with the hot plastic causing the label to firmly bond to the wall of the container 26. The wheel 22 continues to rotate in a counter-clockwise direction allowing time for the molded container 26 to cool before it is ejected at the bottom of the wheel 22.

FIGS. 2-5, inclusive, show an in-mold label dispenser indicated generally at 30 for use in a blow molding machine such as described hereinabove. The label dispenser 30 is essentially the same as that disclosed in the Slat et al. patent, supra, and comprises a base 31 including a pair of spaced apart, vertical plates 32, 33 on each of which is provided one of a pair of bearings 34, 35 for rotatably supporting a main drive shaft 36. A pair of gears 37, 38 are mounted on the shaft 36 between the bearings 34, 35 and mesh with a pair of offset, intermediate gears 39, 40, respectively. The gear 39 is mounted onto the input shaft 41 of a first gearbox 42 and the gear 40 is mounted on the input shaft 43 of a second gearbox 44. The first and second gearboxes 42, 44 are each mounted to one of the pair of vertical plates 32, 33, respectively.

Figure 4:
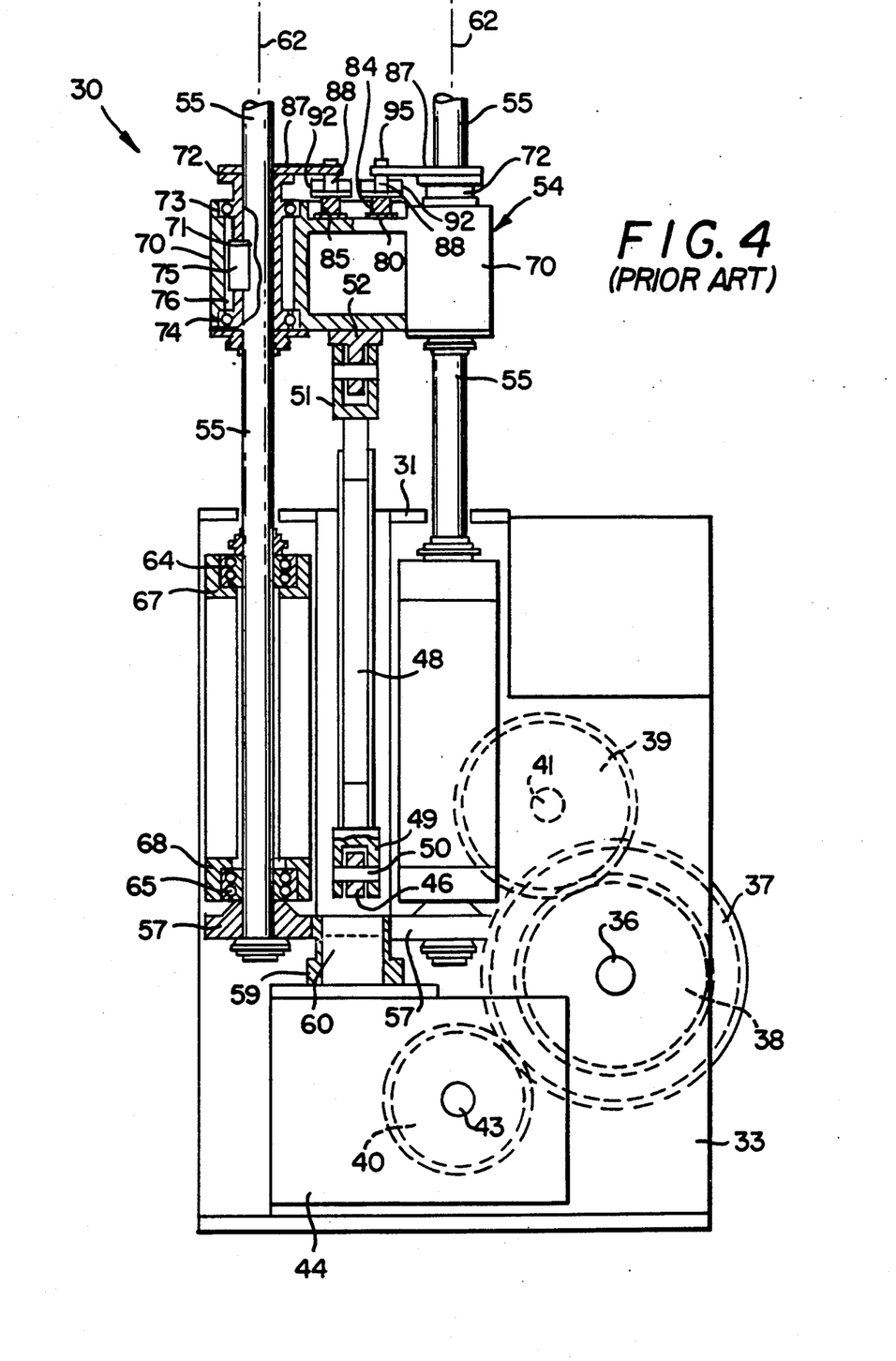
FIG. 4 is a side elevational view, partly in section, of the prior art in-mold label dispenser shown in FIGS. 2 and 3.

The first gearbox 42 includes gear and cam mechanisms (not shown) which drive a reciprocating linkage indicated generally at 45. This linkage 45 includes a pivotal lever 46 which is mounted at one end to the output shaft 47 of the first gearbox 42. The lever 46 is pivotally connected at its other end to a vertical connecting link 48. The link 48 has a yoke 49 at its lower end within which the other end of lever 46 is pivotally mounted by means of a pivot pin 50 as best shown in FIG. 4. The connecting link 48 further includes a yoke 51 at its upper end which is pivotally connected to a lug 52 affixed to the bottom end of a label dispensing head indicated generally at 54.

Figure 2:
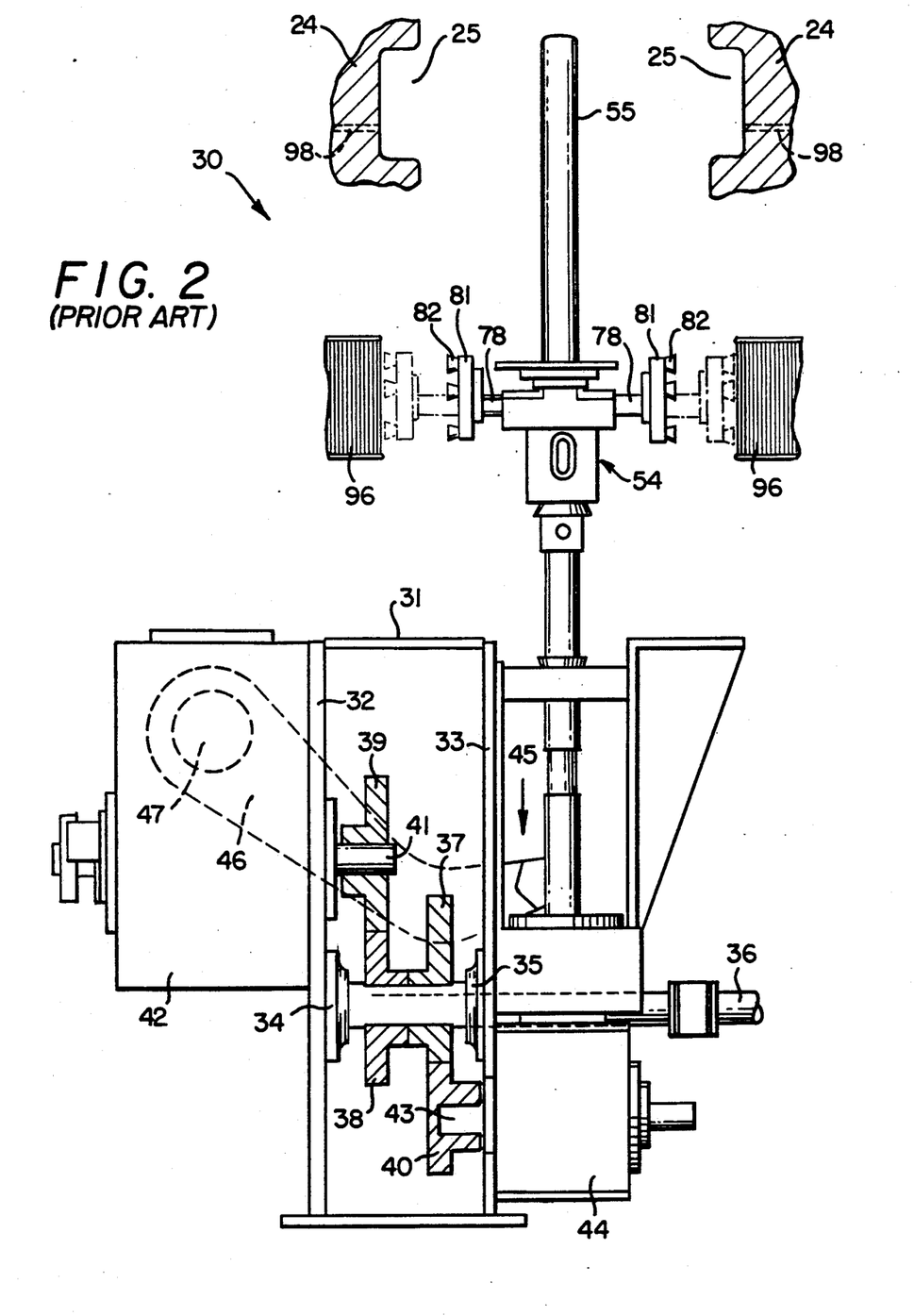
FIG. 2 is an elevational view, partly in section, of an in-mold label dispenser of the prior art showing the dispensing head and label carriers in a position adjacent to the label magazines.
Figure 3:
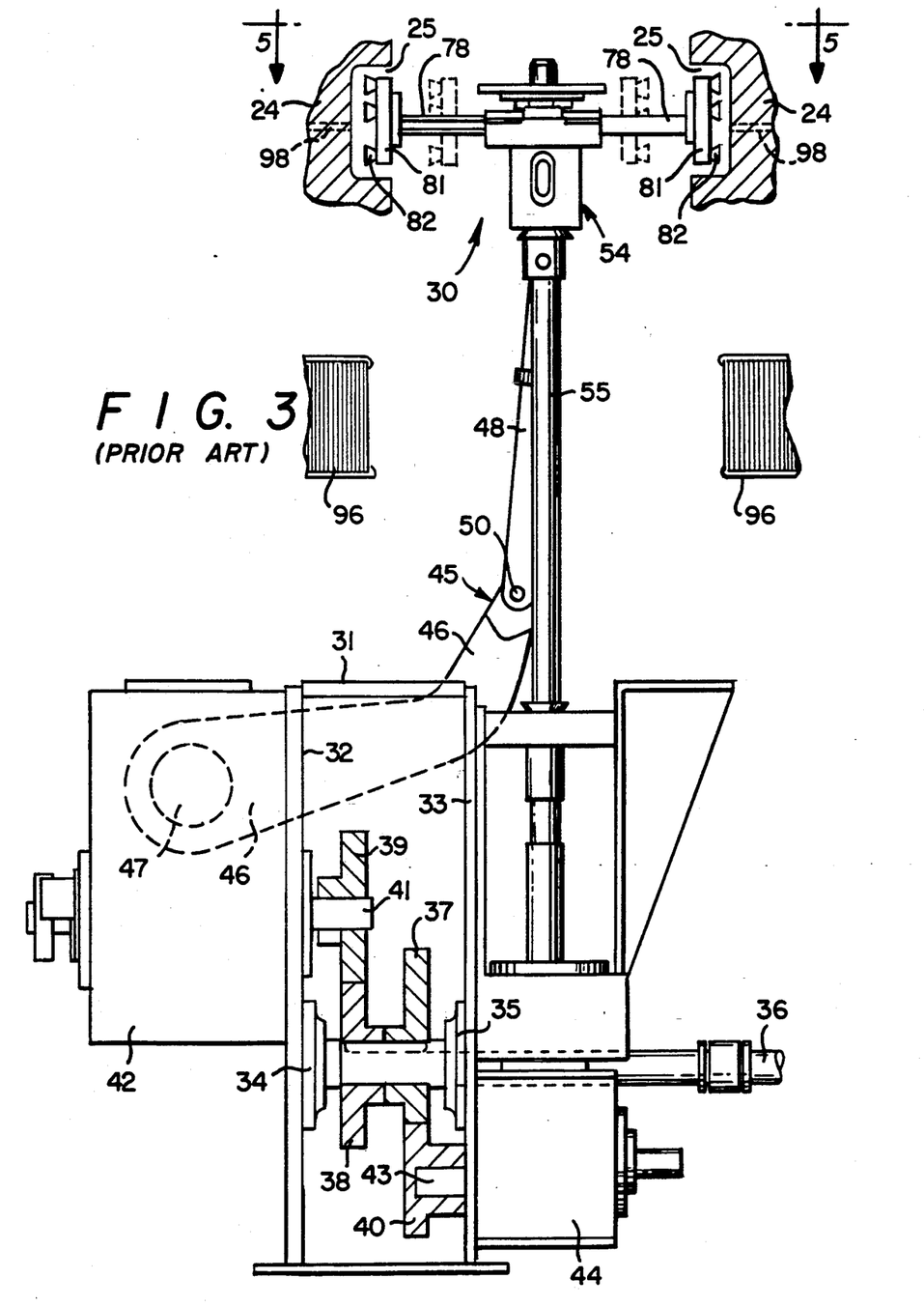
FIG. 3 is a similar view of the same prior art in-mold label dispenser but showing the dispensing head and label carriers in a position adjacent to the open mold sections.

The label dispensing head 54 is mounted for rectilinear movement along a pair of spaced apart, elongated shafts 55. The shafts 55 are mounted in the base 31 and extend parallel to one another upwardly to between the open mold sections 24 as best shown in FIGS. 2 and 3. Each of the shafts 55 has mounted to its lower end one of a pair of gears 57 (FIG. 4). These gears 57 engage with a common drive gear 59 which is mounted onto the output shaft 60 of the second gearbox 44.

The second gearbox 44 similarly includes a gear mechanism (not shown) which imparts an oscillating movement to the output shaft 60. This in turn causes the pair of elongated shafts 55 to oscillate about their respective longitudinal axes indicated at 62. Each of the shafts 55 are mounted for rotation within a pair of upper and lower, anti-friction bearings 64, 65. The bearings 64, 65 are mounted within lugs 67, 68 affixed to the base 31.

Figure 5:
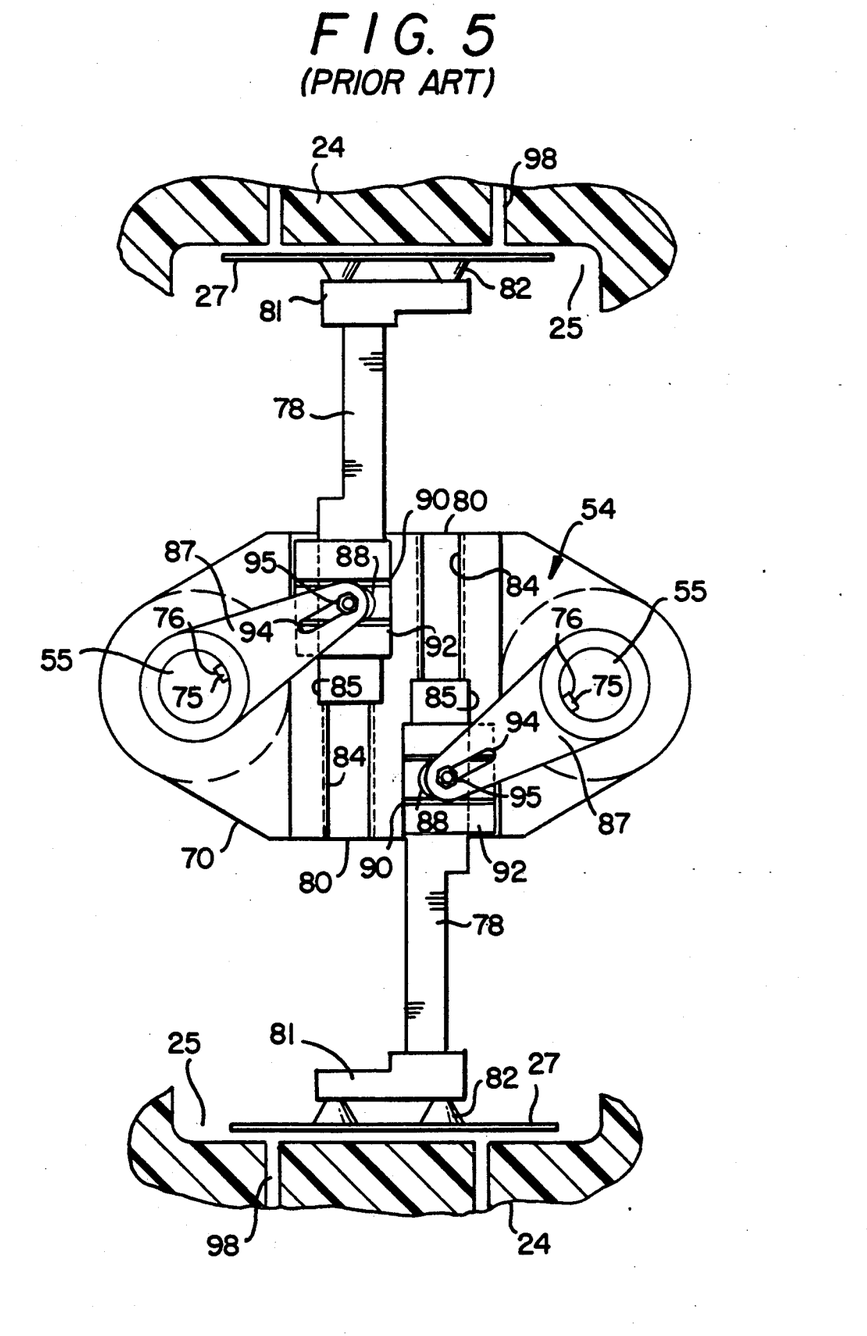
FIG. 5 is a top plan view of the dispensing head and label carriers taken along the line 5—5 in FIG. 3.

The dispensing head 54 is shown in greater detail in FIGS. 4 and 5. As shown, the dispensing head 54 includes a hollow housing 70 having an opening 71 at each opposite end thereof. Bushings 72 are disposed in each opening 71 and surround the elongated shafts 55. Each bushing 72 is rotatably mounted within upper and lower anti-friction bearing 73, 74 at opposite ends of each opening 71. A key 75 is affixed to each bushing 72 and is slidable received within an elongated slot 76 extending along the length of each shaft 55 parallel to its longitudinal axis 62. It will be seen by this construction that the dispensing head 54 is free to move rectilinearly along the elongated supports 55 in response to the reciprocating action of the pivotal linkage 45. It will be further seen that both of the shafts 55 are free to oscillate about their respective axes 62 in response to the oscillating motion imparted to the shafts by the gears 57 via the drive gear 60 and the second gearbox 44.

As best shown in FIG. 5, a pair of elongated label carriers 78 are mounted for rectilinear motion within a pair of parallel slideways 80 extending across the top surface of the housing 70. Each of the label carriers 78 has mounted to its outer end a vacuum head 81. The vacuum head 81 has affixed to its outer end a plurality of vacuum cups 82. The vacuum cups 82 receive and hold the labels 27 in place at the end of each label carrier 78 when a vacuum is applied as shall be described in greater detail hereinafter. As shown in FIGS. 4 and 5, each slideway 80 is formed on its opposite side walls with projections 84 which engage with slots 85 provided on the opposite side walls of the label carriers 78 (see also FIG. 10). This arrangement serves to hold the label carriers 78 in place as they move transversely across the dispensing head 54.

A pair of levers 87 are fixedly mounted to the upper ends of the bushings 72 and rotate in both a clockwise and counter-clockwise direction in response to the oscillating movement of the elongated shafts 55. Each lever 87 has secured to its outer end a cam follower 88 which is slidably mounted within an elongated track 90. The track 90 is part of a cam 92 which is mounted onto each label carrier 78. The track 90 extends transversely across the label carrier 78 in a perpendicular relationship to the direction of movement of the label carrier along its respective slideway 80 on top of the dispensing head 54.

In order to adjust the length of travel of each label carrier 78, the levers 87 are each provided at their outer ends with an elongated slot 94 for mounting the cam follower 88. The cam follower 88 extends through the slot 94 and is secured in place by a nut 95. Thus, by adjusting the position of the cam member 88 along the slot 94, the extent of movement of the label carrier 78 during each complete rotation of the lever 87 can be easily controlled.

The main drive shaft 36 preferably operates at a 1:1 ratio with respect to the main gear drive (not shown) for the wheel 22 such that the label dispenser 30 will undergo one complete cycle to deposit a pair of labels 27 during the time interval when the mold sections 24 are opened and separated from one another as illustrated in both FIGS. 2 and 3. One complete rotation of the main drive shaft 36 will result in one reciprocation of the label dispensing head 54 upwardly from a position between a pair of label magazines 96, i.e., the position of the head 54 shown in FIG. 2, to a position between the opened mold sections 24, i.e., the position of the head 54 shown in FIG. 3, and then back again to its position between the label magazines 96. The second gearbox 44, on the other hand, preferably operates at a 1:2 ratio and one complete rotation of the main drive shaft 36 will result in two reciprocations of the label carriers 78 both outwardly and then inwardly of the dispensing head 54, one at the bottom of the dispensing head stroke in order to receive a pair of labels 27 and one at the top of the dispensing head stroke to deposit the pair of labels 27 within the cavity sections 25 as shall now be described.

When the label carriers 78 move outwardly to their extended position at the top of the dispensing head stroke, the vacuum heads 81 enter the cavity sections 25 and position the labels 27 adjacent to the cavity walls as shown in FIG. 5. The labels 27 are then quickly transferred to the walls of the cavity sections 25 by releasing the vacuum and passing a short blast of air through the cups 82. A vacuum is simultaneously applied to a plurality of vacuum ports 98 located in the cavity walls which hold the labels 27 in place during the molding operation. The application of vacuum and air to the cups 82 is suitably controlled by a cam mechanism (not shown) which is driven from the main drive shaft 36.

Although not shown in the drawing, the molds 21 travel along a track (not shown) on the rotating wheel 22 as they pass from the extrusion to the ejection and labeling stations during the molding operation. Unfortunately, the track may not always position the molds at precisely the same location as they arrive at the label dispenser 30 to receive a pair of labels 27. This problem is caused by over-tolerances that normally exists in the molding machine parts and/or to normal wear and erosion of the parts during operation. In any event, the variance in mold location when the molds 21 arrive at the labeling station can result in misalignment of the labels 27 when applied to the molded containers 26.

Turning now to FIGS. 6–15, inclusive, the numeral 100 refers generally to an improved in-mold label dispenser according to the invention. The label dispenser 100 employs basically the same type of drive mechanism as described hereinabove including a first and second gear unit 42 and 44, reciprocating linkage 45, dispensing head 54 and the oscillating shafts 55. However, the improved label dispenser 100 advantageously employs certain modifications to the label carriers and cam assemblies to be hereinafter described which effectively circumvent the above noted problems and difficulties encountered in the prior art. Although the label dispenser of the invention is preferably constructed so as to apply a pair of labels 27 to the cavity sections 25, it will be understood that the label dispenser can also be constructed so as to deposit a single label into only one of the cavity sections 25.

Figure 6:
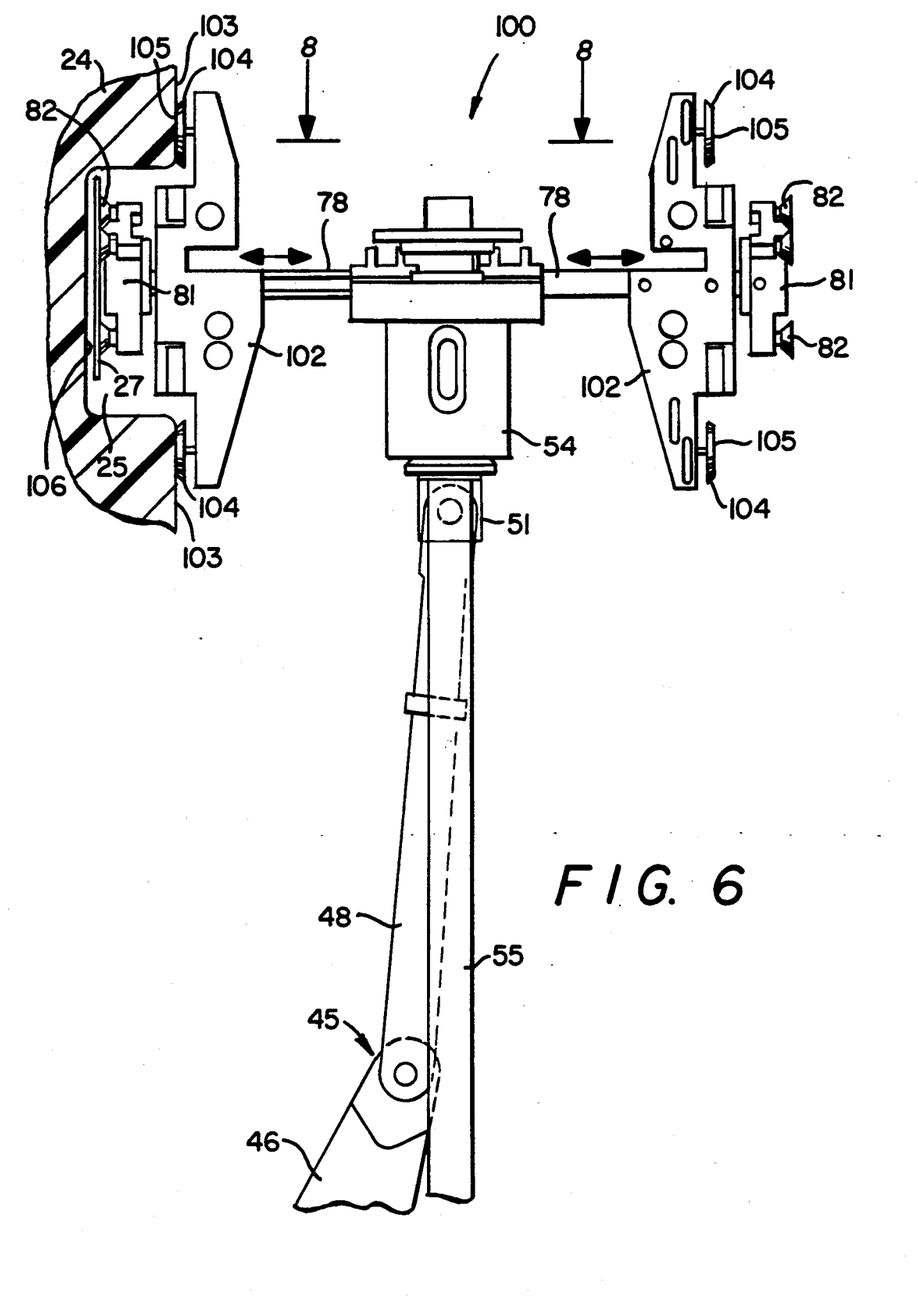
FIG. 6 is an elevational view, partly in section, of an improved in-mold label dispenser according to the invention.
Figure 7:
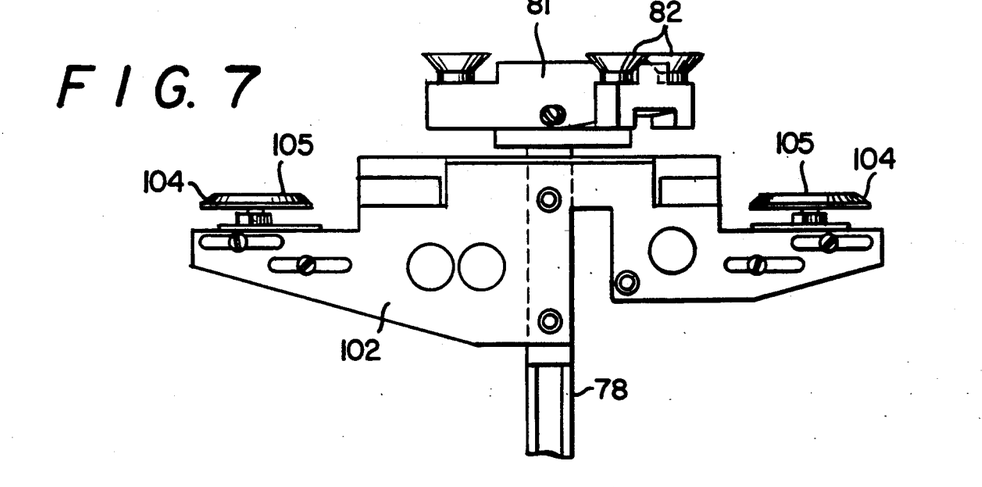
FIG. 7 is an enlarged, elevational view of the label carrier used in the improved in-mold label dispenser according to the invention.

As best shown in FIGS. 6 and 7, the in-mold label dispenser 100 includes a pair of label carriers 78, each of which has mounted to its outer end a vacuum head 81 including a plurality of vacuum cups 82. The label carriers 78 are mounted within the dispensing head 54 for rectilinear movement between retracted and extended positions in the same manner as described hereinabove. Similarly, the dispensing head 54 is mounted onto the oscillating shafts 55 for rectilinear movement along their length between a pair of label magazines (not shown) and the mold sections 24, only one of which is shown in the view of FIG. 6.

According to the invention, an adjustable stop assembly 102 is mounted to the outer end of each label carrier 78 for stopping movement of the carrier as soon as the label 27 has been placed in position for transfer to the wall of the cavity section 25. The stop assembly 102 is mounted in a vertical position just behind the vacuum head 81 and extends transversely in a perpendicular relationship across the label carrier 78. It will be seen by this construction that the stop assembly 102 overlies the outer face 103 of the mold section 24 surrounding the cavity section 25 when the vacuum head 81 enters the cavity section 25 to deposit a label 27. Adjustable feet 104 are mounted to the upper and lower ends of the stop assembly 102 for making contact with the outer face 103 of the mold section 24 during each stroke of the label carrier 78. The feet 104 are dish-shaped with flattened bottoms 105 and are preferably made from a plastic or a soft metal, such as brass or aluminum, to avoid scoring the mold surface 103.

The feet 104 are individually adjusted so that during each stroke of the label carrier 78, the vacuum head 81 carrying the label 27 will be permitted to move a sufficient distance into the cavity section 25 to establish a gap 106 of predetermined width between the label 27 and the wall of the cavity section 25. The width of the gap 106 should be such as to permit movement of the cavity wall as the mold 21 passes by the label dispenser 30 without touching the label 27 during the instant of time before the label is transferred. Typically, a width of from about 1/16 to about ¼ inch is satisfactory, for example. It is important to note, of course, that by this construction the label carrier 78 will accurately place each label 27 at this precise gap width during each stroke of the label carrier 78 despite the fact that the location of the molds 21 may vary as they approach and pass through the labeling station.

Figure 8:
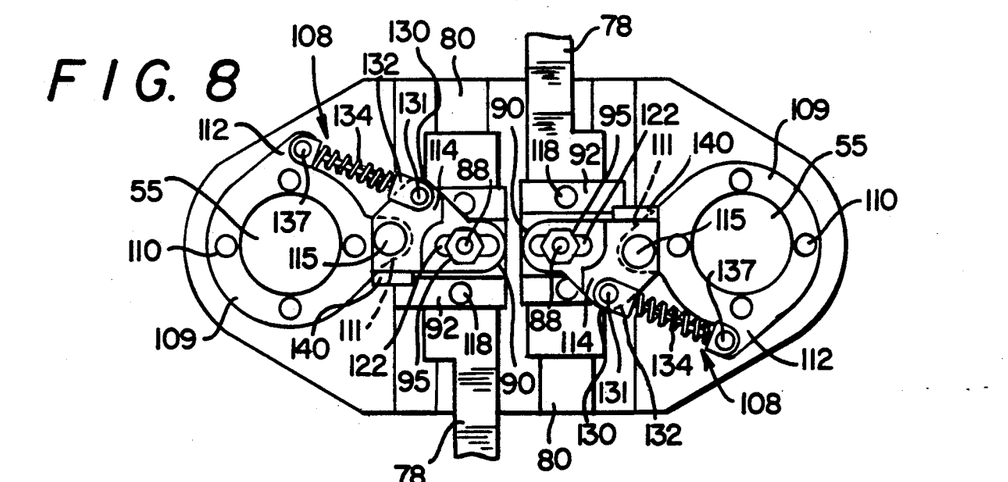
FIG. 8 is a top plan view of the improved in-mold label dispenser taken along the line 8—8 in FIG. 6.
Figure 9:
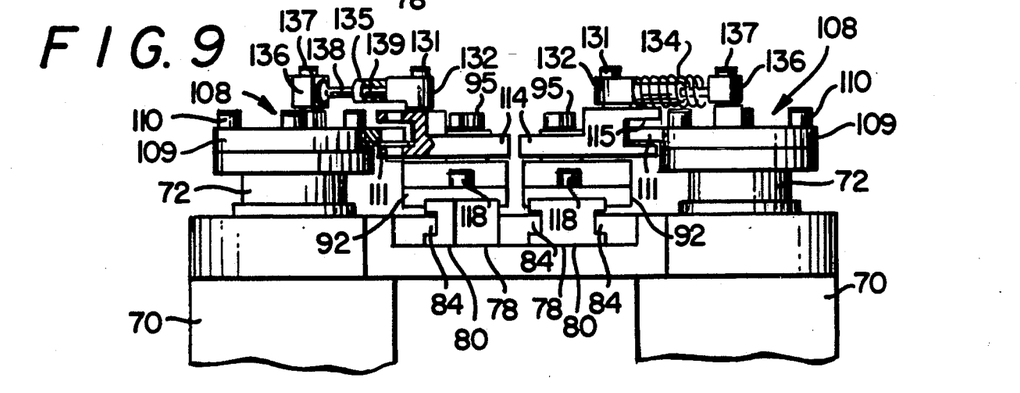
FIG. 9 is an elevational view of the improved in-mold label dispenser taken along the line 9—9 in FIG. 8.

Referring now to FIGS. 8 and 9, a pair of oscillating lever assemblies indicated generally at 108 are provided for effecting movement of the label carriers 78 rectilinearly between retracted and extended positions in a manner similar to that described hereinabove. The oscillating lever assemblies 108 include annular mounts 109 secured by bolts 110 to the bushings 72 (FIG. 4) surrounding the oscillating shafts 55. Each mount 109 is formed at its outer circumference with first and second offsets 111, 112, the first offset 111 (shown in phantom in FIG. 8) being located on the side of the mount 109 facing its respective label carrier 78. The second offset 112 is spaced apart approximately 90 degrees from the first offset 111 in a counter-clockwise direction as shown in the view of FIG. 8.

A triangular-shaped actuating lever 114 is pivotally connected at one end to the first offset 111 on the annular mount 109 by a hinge pin 115. The opposite end of the actuating lever 114 carries the cam follower 88 which is slidably positioned within the track 90 of cam 92 in the same manner as described hereinabove. The track 90 is orientated transversely across the label carrier 78 so that movement of the cam follower 88 along the track 90 causes the label carrier 78 to move rectilinearly along the slideway 80.

Figure 10:
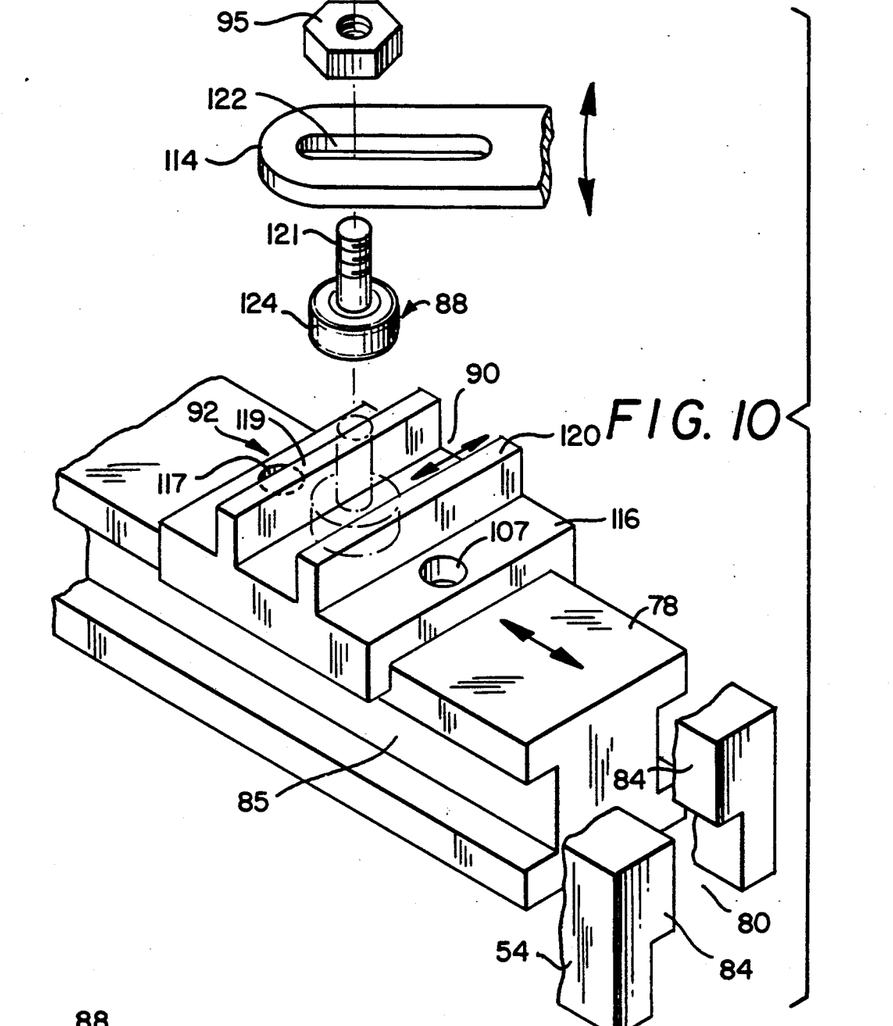
FIG. 10 is an enlarged, exploded view of the cam and cam follower assembly shown in FIGS. 8 and 9.

FIG. 10 is an exploded assembly view showing the cam and cam follower in greater detail. As shown, the cam 92 comprises a flat base section 116 having holes 117 for securing the cam to the label carrier 78 by means of bolts 118 (FIGS. 8 and 9). The base section 116 is formed with two upstanding wall sections 119, 120 which together define the track 90 for guiding movement of the cam follower 88. For purposes of illustration, the cam follower 88 is also shown in phantom lines within the track 90. The cam follower 88 is guided by the track 90 in a direction generally perpendicular to the direction of movement of the label carrier 78 as depicted by the arrows in the drawing. The cam follower 88 has a threaded stem 121 which extends through an elongated slot 122 in the opposite end of the actuating lever 114. The lever 114 is adjustably secured to the cam follower 88 by the nut 95 in order to set the label carrier stroke in the same manner as described hereinabove.

Figure 11:
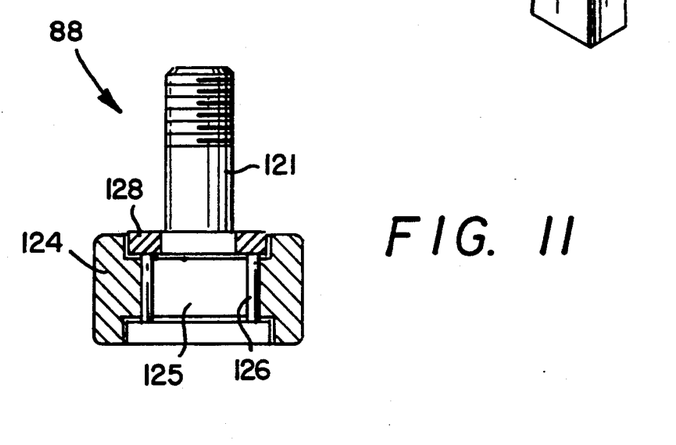
FIG. 11 is an enlarged, elevational, sectional view of the cam follower shown in FIG. 10.

The structure of the cam follower 88 is shown in greater detail in FIG. 11. The cam follower 88 includes an annular outer race 124 which is mounted around an inner bearing race 125 formed by the enlarged diameter, lower, cylindrical end portion of the stem 121. Antifriction bearings 126 are mounted between the outer and inner races 124, 125 which permit the former to rotate freely around the lower end of the stem 121 when the cam follower 88 moves along the cam track 90. The outer race 124 is held in place by a collar 128 surrounding the stem 121. The collar 128 is located at a point slightly above the outer race 124 so that its upper surface abuts against the underside of the lever 114 when the cam follower 88 is secured in the slot 122 by the nut 95.

With reference again to FIGS. 8 and 9, the apex end 130 of the triangular actuating lever 114 is locating toward the rearward end of the label carrier 78 and carries a post 131 on which is pivotally mounted a female end fitting 132 for a compression spring, e.g., a coil spring 134. One end of the coil spring 134 surrounds a cylindrical extension 135 (FIG. 9) projecting outwardly from the female end fitting 132 while the other end of the spring 134 abuts against a male end fitting 136 pivotally mounted onto a post 137 which is secured to the second offset 112 on the annular mount 109. The male end fitting 136 includes a rod 138 (FIG. 9) which extends outwardly through one end of the coil spring 134. The outer end of the rod 138 passes freely through a central bore 139 provided within the cylindrical extension 135. This arrangement provides support for the spring 134 while undergoing compression between the male fitting 136 and the female fitting 132.

It will be seen that when the annular mounts 109 are rotated in a clockwise direction by the shafts 55, the levers 114 are pulled by the hinge pins 115 in a direction transverse to the direction of movement of the label carriers 78. This forces the cam followers 88 to move longitudinally along their respective cam tracks 90 which in turn forces the label carriers 78 to move rectilinearly along the slideways 80 in an outward direction from the dispensing head 54. The vacuum heads 81 at the ends of label carriers 78 enter the cavity sections 25 along with the vacuum cups 82 and the labels 27 and move in a direction toward the cavity walls until the adjustable feet 104 on the stop assemblies 102 contact the outer faces 103 surrounding each of the mold sections 24. This restricts further movement of the label carriers 78 within the cavity sections 24 even though the shafts 55 and the annular mounts 109 continue to rotate as shall be explained more fully hereinafter. The feet 104 are adjustable in a direction substantially parallel to the direction of movement of the label carrier 78 so that when they make contact with the outer faces 103, the label carriers 78 will have moved a sufficient distance into the mold sections 24 to place the labels 27 adjacent to the walls of the cavity sections 25, being separated therefrom by the width of the gap 106. As explained hereinabove, the molds 21 travel around the rotating wheel 22 on a track which due to normal manufacturing tolerances and/or wear and erosion of the parts can result in one or more of the molds 21 being positioned at different locations with respect to the label dispenser as the molds pass by the labeling station. If the variance between the mold location and the label is such that the feet 104 on the stop assemblies 102 contact outer faces 103 of the mold sections 24 to restrict further movement of the label carriers 78 before the shafts 55 and annular mounts 109 have completed their respective oscillations, the label carriers 78 along with the vacuum heads 81 and cups 82 may be placed under sever stress causing possible damage thereto. However, this problem is effectively circumvented by the provision of the biased or spring-loaded, adjustable levers 114 according to the invention. Thus, in such cases, continued rotation of the annular mounts 109 will force the coil spring 134 to undergo compression between the male and female fittings 136, 132, thereby taking up the stress that might otherwise be placed upon the label carrier and its associated parts. This action will continue, of course, until the shafts 55 stop rotating and reverse direction. It will also be noted that the cam followers 88 are free to move transversely along the cam tracks 90 as they follow the levers 114 upon continued rotation of the annular mounts 109, even though movement of the label carriers has been restricted by the stop assemblies 102.

After the pair of labels 27 have been transferred to the walls of the cavity sections 25, the annular mounts 109 are rotated by the shafts 55 in the reverse or counterclockwise direction causing the labels carriers 78 to return to the retracted position on top of the dispensing head 54. In this case, the hinge pins 115 push the levers 114 transversely in the opposite direction across the label carriers 78 causing the cam followers 88 to move along the cam track 90 also in the opposite direction upon rotation of the annular mounts 109. The levers 114 are further provided with lugs 140 which depend from the side wall opposite the apex end 130 and at a point close to the hinge pins 115. When the annular mounts 109 are rotated counterclockwise, the lugs 140 make contact with the offsets 111 and provide a positive engagement for moving the levers 114.

Figures 12, 13, 14:
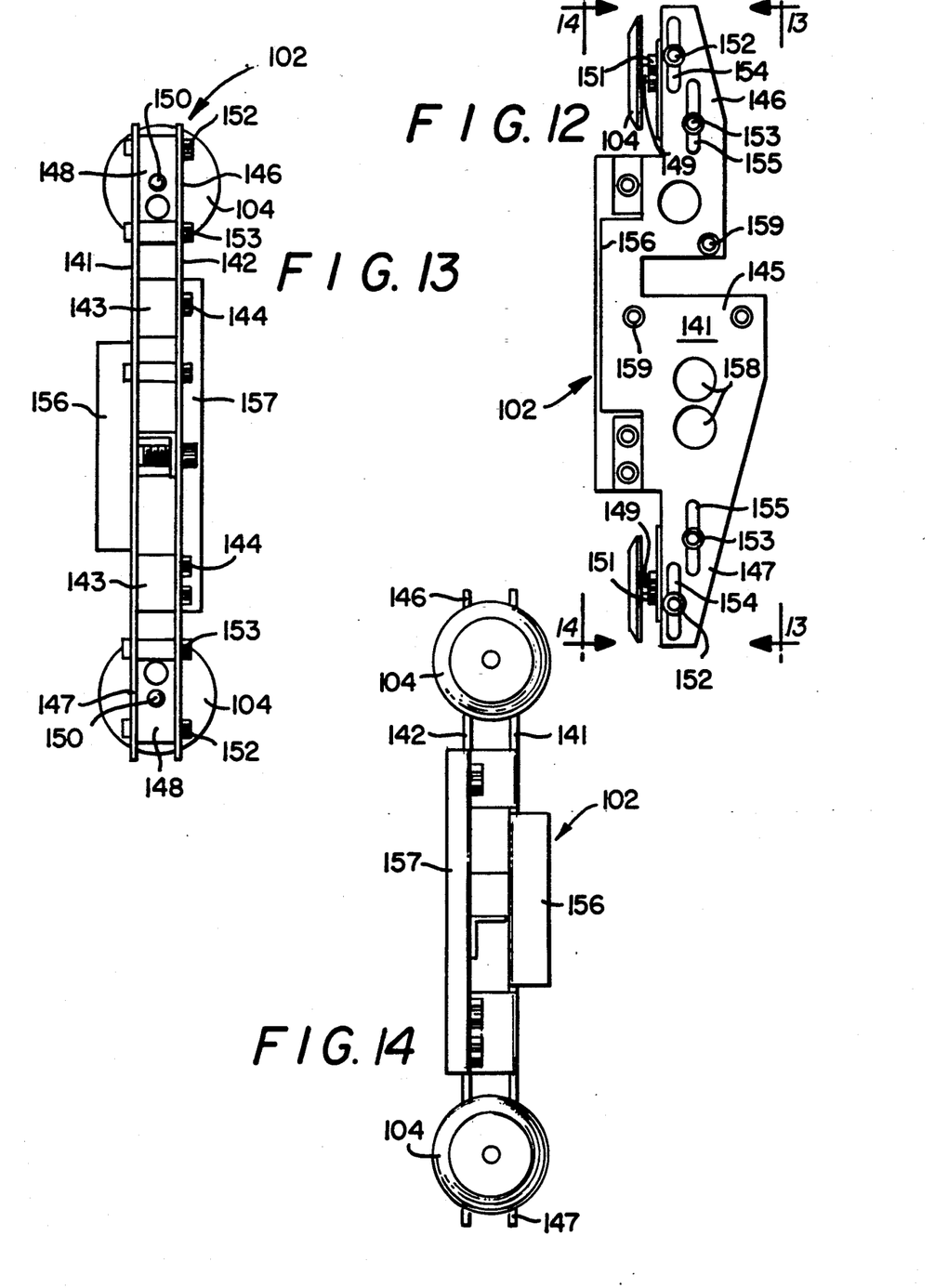
FIG. 12 is an enlarged elevational view of the adjustable stop assembly used in the label carrier of the improved in-mold label dispenser according to the invention.
FIG. 13 is a view taken along the lines 13—13 in FIG. 12.
FIG. 14 is a view taken along the lines 14—14 in FIG. 12.

FIGS. 12-14, inclusive, show in greater detail the preferred construction of the adjustable stop assemblies 102 according to the invention. The stop assemblies 102 are designed to be both rigid and lightweight, each including a pair of side plates 141, 142 which are held in equi-distant, spaced apart relation by spacer members 143 secured in place by rivets 144. The plates 141, 142 are each configured to include a mid-section 145 and upper and lower elongated arms 146, 147, respectively. Each of the arms 146, 147 are recessed back from the mid-section 145 to accommodate the pair of adjustable feet 104.

The feet 104 are mounted onto adjustable blocks 148 by threaded studs 149 screwed into tapped holes 150. A nut 151 secures each stud 149 in place once the feet 104 have been adjusted to the correct distance from the blocks 148. The blocks 148 are adjustably secured between the upper and lower arms 146, 147 of each side plate 141, 142 by a pair of bolts 152, 153 which pass through offset slots 154, 155, respectively. It will be seen by this construction that the feet 104 can be easily adjusted in both the lateral and longitudinal direction with respect to the arms 146, 147 in order to accurately position the labels 27 within the mold cavities 25.

The side plates 141, 142 are formed with flange portions 156, 157, respectively, which depend outwardly in a perpendicular direction with respect to each of the plates, the flange portions serving to add rigidity to the stop assemblies 102 without significantly increasing the weight thereof. The side plates 141, 142 are further provided with large holes 158 for the purpose of reducing the weight of the stop assemblies. Mounting holes 159 are also provided within the mid-section 145 for mounting the stop assemblies 102 onto the label carriers 78.

Figure 15:
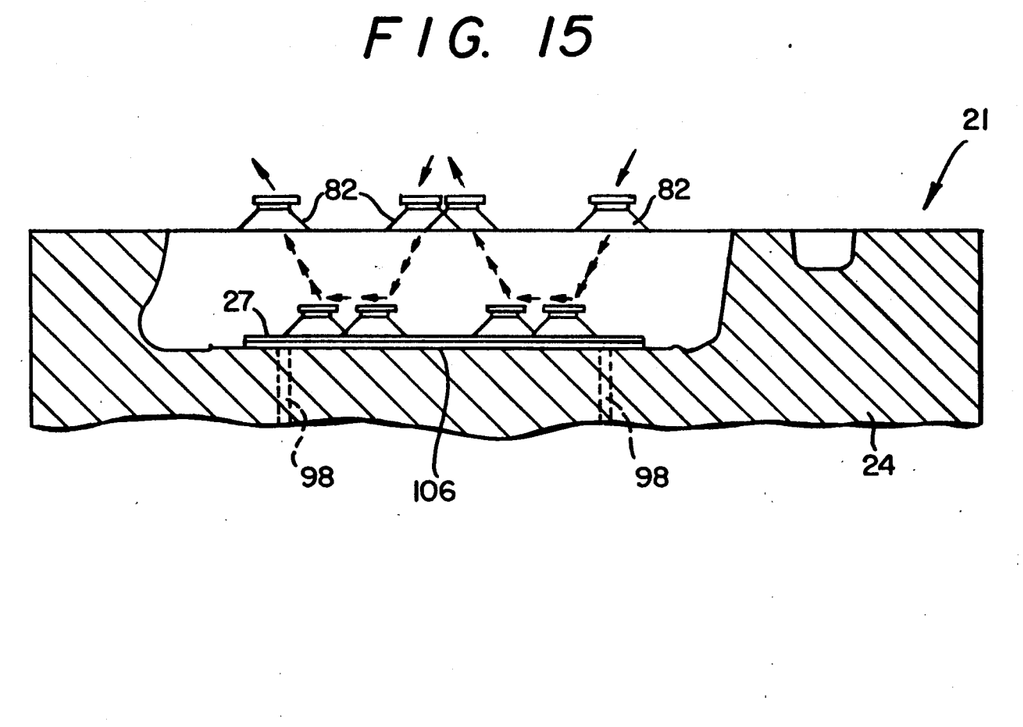
FIG. 15 is an enlarged sectional view of a mold and its cavity section showing schematically the various positions of the vacuum cups used on the label carrier during the in-mold label dispensing operation according to the invention.

FIG. 15 shows schematically the various positions of the vacuum cups 82 during the process of transferring each label 27 onto the wall of each cavity section 25. Although the cups 82 remain stationary while the mold 21 and its movable sections 24 are rotated continuously around the wheel 22, the opposite arrangement is shown in the view of FIG. 15 in order to better illustrate the relative motion of the cups 82 with respect to the cavity section 25, the arrows showing the path followed by two cups 82 upon entering the cavity section 25 to deposit a label 27. The cups 82 position the label 27 close to the wall of the cavity section 25 and dwell a short period in order to allow time for the vacuum ports 98 to transfer the label.

What is claimed is:

1. A label carrier for an in-mold label dispenser having a dispensing head including means for slidably mounting one end of said label carrier thereto, said label carrier including at its opposite end a vacuum head having vacuum cups for depositing a label within the mold cavity of an open mold and an adjustable stop assembly mounted to said label carrier at a point behind said vacuum head and having elongated arms extending transversely in a direction perpendicular to the direction of movement of said label carrier, said elongated arms having adjustable contact members positioned to make contact with a surface portion of said mold to stop movement of said label carrier after said vacuum cup has moved a predetermined distance within said mold cavity.

2. A label carrier according to claim 1, wherein the stop assembly includes a pair of spaced apart side plates forming said elongated arms at the opposite ends of said stop assembly, said side plates being affixed to said label carrier at their mid-section and including a pair of blocks slidably mounted between said side plates at the portion thereof forming said elongated arms, said contact members being adjustably secured to said blocks.

3. A label carrier according to claim 2, wherein the blocks are slidably mounted within elongated slots provided within each of said side plates.

4. A label carrier according to claim 3, wherein the contact members are adjustably mounted to said blocks by screws secured in tapped holes within said blocks and a nut secured to said screws.

5. A label carrier according to claim 4, wherein said contact members are dish-shaped feet having flattened bottoms.

6. In a blow molding machine including at least one mold having mold sections movable between open and closed positions, said mold sections including cavity sections which cooperatively define a cavity for performing the blow molding operation when in the closed position and which permit ejection of a molded part when in the open position, the improvement comprising a label dispenser including a label carrier positioned to move rectilinearly between an extended position adjacent to one of said mold sections and a retracted position, said label carrier including at one end a vacuum head having vacuum cups for holding a label to be deposited within the cavity section of an open mold section and an adjustable stop assembly mounted to said label carrier at a point behind said vacuum head and having elongated arms extending transversely in a direction perpendicular to the direction of movement of said label carrier, said elongated arms having adjustable contact members positioned to make contact with a surface portion of said mold to stop movement of said label carrier after said label carrier has moved a sufficient distance within said cavity section to establish a gap of predetermined width between said label and said cavity section.

7. A blow molding machine according to claim 6, wherein the stop assembly includes a pair of spaced apart side plates forming said elongated arms at the opposite ends of said stop assembly, said side plates being affixed to said label carrier at their mid-section and including a pair of blocks slidably mounted between said side plates at the portion thereof forming said elongated arms, said contact members being adjustably secured to said blocks.

8. A blow molding machine according to claim 7, wherein the blocks are slidably mounted within elongated slots provided within each of said side plates.

9. The blow molding machine according to claim 8, wherein the contact members are adjustably mounted to said blocks by screws secured in tapped holes within said blocks and a nut secured to said screws.

10. A blow molding machine according to claim 9, wherein said contact members are dish-shaped feet having flattened bottoms.

11. In combination: a mold having an open cavity section and a label dispenser for depositing a label onto the wall of said cavity section, said label dispenser including a label carrier positioned to move rectilinearly into said cavity section, said label carrier including at an outer end a vacuum head having vacuum cups for holding said label to be deposited and means for stopping movement of said label carrier after said label carrier has moved a sufficient distance into said cavity section to establish a gap of predetermined width between said label and said wall of said cavity section wherein the stopping means includes elongated arms mounted to said label carrier transversely in a perpendicular relationship to its direction of movement and having contact members positioned to make contact with a surface portion of said mold surrounding said cavity section for stopping movement of said label carrier.

12. The combination according to claim 11, wherein the elongated arms include means for adjusting the position of said contact members.

13. The combination according to claim 12, wherein the adjusting means includes a block mounted to the end of each elongated arm and which is slidable in a longitudinal direction along said arm.

14. The combination according to claim 13, wherein the block is slidably mounted within elongated slots provided at the outer end of each elongated arm.

15. The combination according to claim 14, wherein the adjusting means further includes a screw positioned within a tapped hole in said block and a nut for securing said screw in place.

16. The combination according to claim 15, wherein the contact members are dish-shaped feet having flattened bottoms.

17. An in-mold label dispenser for a blow molding machine including at least one mold having mold sections movable between open and closed positions, said mold sections including cavity sections which cooperatively define a cavity for performing the blow molding operation when in the closed position and which permit ejection of a molded part when in the open position, said label dispenser comprising, in combination: a base; a pair of label magazines for storing labels and a pair of label carriers for depositing a pair of labels on the walls of said mold sections; a dispensing head mounted on the base for movement along a first path from adjacent said label magazine to between said mold sections in the open position; a label carrier mounted on said dispensing head for movement along a second path substantially transverse to said first path from a retracted to an extended position to receive a label when said dispensing head is adjacent said label magazine and from a retracted to an extended position to deposit said label onto the wall of said cavity section when said dispensing head is moved to between said mold sections in the open position, said label carrier including means for stopping its movement along said second path after said label carrier has moved a sufficient distance into cavity section to establish a gap of predetermined width between said label and the wall of said cavity section and a vacuum head mounted to its outer end, said vacuum head including at least one vacuum cup for receiving, holding and depositing a label, said stopping means mounted to said label carrier behind said vacuum head; a drive mechanism mounted in said base for moving said dispensing head along said first path and said label carrier along said second path in co-ordination with the movement of said mold, said drive mechanism including an elongated support extending between said base and said dispensing head and means for oscillating said elongated support about an axis which is substantially transverse to said second path; and a lever assembly connected between said elongated support and said label carrier to provide extending and retracting movement of said label carrier upon oscillation of said elongated support wherein said lever assembly includes bias means arranged so as to permit continued movement of said lever assembly by said elongated support after said stopping means has been engaged to stop movement of said label carrier.

18. An in-mold label dispenser according to claim 17, wherein the elongated arms include means for the position of said contact members.

19. An in-mold label dispenser according to claim 18, wherein the adjusting means includes a block mounted to the end of each elongated arm and which is slidable in a longitudinal direction along said arm.

20. An in-mold label dispenser according to claim 19, wherein the block is slidably mounted within elongated slots provided at the outer end of each elongated arm.

21. An in-mold label dispenser according to claim 19, wherein the adjusting means further includes a screw positioned within a tapped hole in said block and a nut for securing said screw in place.

22. An in-mold label dispenser according to claim 17, wherein the contact members are dish-shaped feet having-flattened bottoms.

23. An in-mold label dispenser according to claim 17, wherein the dispensing head includes a slideway within which said label carrier is mounted for said rectilinear movement between retracted and extended positions, said label carrier including a cam track mounted thereon extending transversely to the direction of said rectilinear movement and a cam follower slidably mounted within said track, said lever assembly being connected to said cam follower.

24. An in-mold label dispenser according to claim 23, wherein the lever assembly includes an annular mount to said elongated support and an elongated lever pivotally connected to said mount at one end thereof, the other end of said lever being connected to said cam follower.

25. An in-mold label dispenser according to claim 24, wherein the bias means includes a coil spring connected at one end to said annular mount and at the other end to said elongated lever, said coil spring undergoing compression between said annular mount and said lever when said elongated support continues to rotate after said stopping means has engaged the surface portion on said mold section.

26. An in-mold label dispenser according to claim 25, wherein the coil spring is mounted between male and female end fittings affixed to said annular mount and said elongated lever, said male fitting having a rod which is slidably engaged within a hollow cylindrical extension projecting from said female fitting and extending through one end of said coil spring.

27. An in-mold label dispenser according to claim 24, wherein the elongated lever is secured to said cam follower by a connection which is adjustable to control the extent of movement of said label carrier.

* * * * *